United States Patent
Krithivas et al.

(10) Patent No.: US 6,816,963 B1
(45) Date of Patent: Nov. 9, 2004

(54) PLATFORM LEVEL INITIALIZATION USING AN IMAGE GENERATED AUTOMATICALLY BY A REMOTE SERVER BASED UPON DESCRIPTION AUTOMATICALLY GENERATED AND TRANSMITTED THERETO BY A PROCESSOR-BASED SYSTEM

(75) Inventors: Ramamurthy Krithivas, Chandler, AZ (US); Emmett R. Uber, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/495,202

(22) Filed: Jan. 31, 2000

(51) Int. Cl.[7] .......................... G06F 15/177; G06F 2/00
(52) U.S. Cl. .................. 713/1; 713/2; 710/10
(58) Field of Search ................ 713/1, 2, 100; 710/10

(56) References Cited

U.S. PATENT DOCUMENTS

| | | | |
|---|---|---|---|
| 5,109,484 A | * 4/1992 | Hughes et al. | 709/222 |
| 5,230,052 A | * 7/1993 | Dayan et al. | 713/2 |
| 5,247,683 A | * 9/1993 | Holmes et al. | 709/221 |
| 5,577,210 A | * 11/1996 | Abdous et al. | 709/219 |
| 6,080,207 A | * 6/2000 | Kroening et al. | 717/172 |
| 6,209,089 B1 | * 3/2001 | Selitrennikoff et al. | 713/2 |
| 6,317,826 B1 | * 11/2001 | McCall et al. | 713/1 |
| 6,427,176 B1 | * 7/2002 | Berglund et al. | 710/8 |

FOREIGN PATENT DOCUMENTS

JP          06290084 A  * 10/1994  .......... G06F/11/34

OTHER PUBLICATIONS

Hauser et al, Performance Study of a LAN Based Image Server, 1991, IEEE, pp. 630–636.*
IBM, Auto–Bios Image Configurator, Jun. 1, 1993, IBM Technical Disclosure Bulletin, vol. 36, Issue 6B, pp. 295–298.*

* cited by examiner

Primary Examiner—Thomas Lee
Assistant Examiner—Suresh K Suryawanshi
(74) Attorney, Agent, or Firm—Trop, Pruner & Hu, P.C.

(57) ABSTRACT

Processor-based systems may be initialized through a network connection so that the systems may be booted using the latest available software. A description of a client processor-based system may be developed and provided to a remote server. The remote server may then develop the necessary firmware for initializing the system, given the latest, updates for example. The firmware may initialize the system in an operating system independent fashion. The server may provide that software to the client to enable the client to efficiently boot, for example without unnecessarily tying up storage on the client. In addition, because the boot initialization routines were acquired from the server, which may be periodically updated, the client may have immediate access to the most up-to-date initialization routines.

20 Claims, 5 Drawing Sheets

PLATFORM LEVEL INITIALIZATION USING AN IMAGE GENERATED AUTOMATICALLY BY A REMOTE SERVER BASED UPON DESCRIPTION AUTOMATICALLY GENERATED AND TRANSMITTED THERETO BY A PROCESSOR-BASED SYSTEM

BACKGROUND

This invention relates generally to the initialization of processor-based systems.

Initialization of processor-based systems generally involves using a basic input/output system (BIOS) which is stored in a read only memory (ROM) and is transferred to system memory during the boot process. The BIOS is generally fixed, immutable and predefined. As a result, BIOS must account for a large number of processor, chipset, memory, and peripheral devices, but this large number is necessarily finite. BIOS is limited in the hardware which it may support by a number of factors, including the available memory or storage, the amount of effort put into compiling the BIOS, and the availability of components at the time the BIOS was developed.

Thus, as a processor-based system evolves, the BIOS remains basically static. This means that the BIOS may be unable to completely adapt to a variety of changed circumstances. These circumstances may include the identification of defects in various software components, which defects may be embedded into the BIOS monolithic code. In addition, the availability of improved and updated capabilities may not be readily incorporated into the BIOS.

While reprogramming the BIOS ROM is certainly possible, it is generally a complex process. As a result reprogramming of the BIOS on the fly is generally not attempted. Moreover, even if the ROM storing the BIOS were periodically updated, changes that may require BIOS adaptability may occur with even greater frequency.

Thus, the ability of BIOS to adapt to a variety of changing circumstances, including rapidly evolving technology, is relatively limited.

Therefore, there is a continuing need for techniques for initializing processor-based systems which are adaptable to a variety of changing circumstances, such as those that may arise after the processor-based system is placed into service.

SUMMARY

In accordance with one aspect, a method includes specifying a description of a processor-based system. The description may be used to build a system image. The system is initialized using the image.

Other aspects are set forth in the accompanying detailed description and claims.

DETAILED DESCRIPTION

Figure 1:
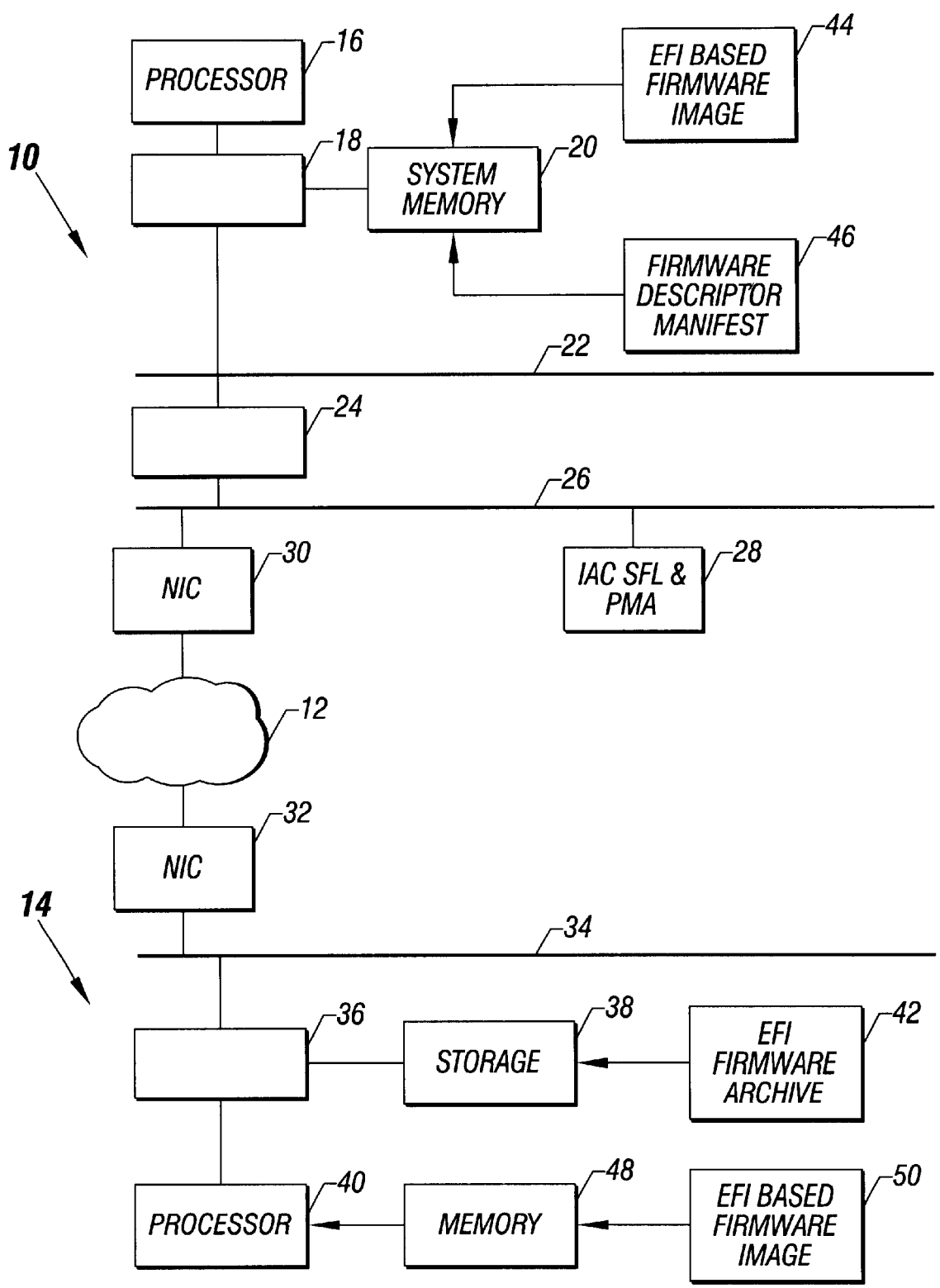
FIG. 1 is a block depiction of one embodiment of the present invention.

Referring to FIG. 1, a processor-based system 10 may include a processor 16 coupled to an interface 18. The interface 18 may be a bridge or a part of a chipset, as examples. The interface 18 may be coupled to a system memory 20.

The interface 18 may also be coupled to a bus 22. In one embodiment of the present invention, the bus 22 is a Peripheral Component Interconnect (PCI) bus which is compliant with the PCI Local Bus Specification, Rev. 2.2, Jun. 8, 1998, available from the PCI Special Interest Group, Portland, Oreg. 97214.

The bus 22 may be coupled to an interface 24 which may be part of a chipset and which may be implemented by a bridge, as examples. A legacy bus 26 may be coupled to the interface 24. Also coupled to the bus 26 is a network interface card (NIC) 30 and a memory 28 which may include software components normally associated with a basic input/output system (BIOS).

Also coupled to the network interface card 30 is a network 12. For example, in one embodiment of the present invention, the connection to the network and the assignment of Internet Protocol (IP) addresses may be handled using dynamic host configuration protocol (DHCP) (see Request For Comments, "RFCs", 1534, 2131 and 2132, available at www.ietf.org). A firmware server 14 may be accessed over the network 12.

The server 14 may include its own network interface card (NIC) 32 coupled to a bus 34. The bus 34 may in turn be coupled to an interface 36 also coupled to a processor 40. The interface 36 may in turn be coupled to a storage device 38, that may store an Extensible Firmware Interface (EFI) firmware archive software 42. A system memory 48 may store an EFI based firmware image 50.

A firmware library stored on a memory 28, may provide library functions to initialize a processor, a chipset, and a system memory. One useful library is the Intel® Applied Computing System Firmware Library (IAC SFL) (http://developer.intel.com/platforms/applied/software/iacs fl.htm). The IAC SFL may support real time operating systems (RTOSs)such as VxWorks available from Wind River Systems, Alameda, Calif. 94501, and Linux, as examples. The IAC SFL performs basic component level initialization.

A platform manifest application (PMA) may be executed to build a firmware descriptor manifest (FDM). The FDM is basically a description of a processor-based system, such as the system 10. The manifest may describe advanced platform attributes and is created immediately after the component level initialization phase using the IAC SFL. Thus, the manifest may describe, for initialization purposes, attributes such as Small Computer System Interface (SCSI) (standards available at www.t10.org) or integrated device electronics (IDE) (standards available at fission.dt.wdc.com/pub/standards/) drives, video controllers and other platform architectural details.

Figure 5:
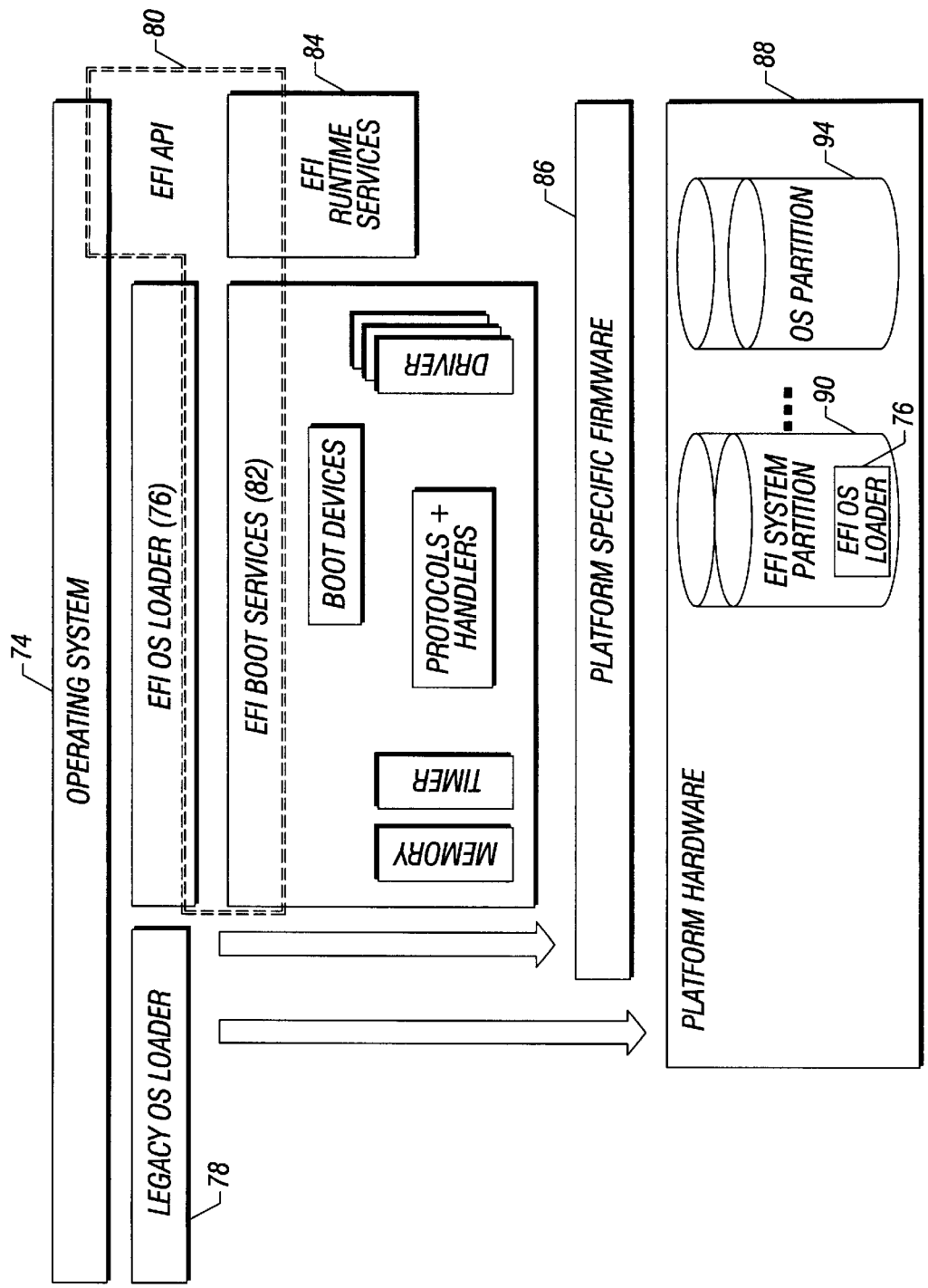
FIG. 5 is a schematic flow diagram for implementing one embodiment of the present invention.

A firmware program based on the IAC SFL supports the Extensible Firmware Interface (EFI) to a real-time operating system (RTOS). (See the Extensible Firmware Interface Specification, Rev. 0.91, Jul. 30, 1999, by Intel Corporation, Santa Clara, Calif., available at www.intel.com). The EFI develops a standard interface between an operating system 74 and platform firmware 86 such as the BIOS as shown in FIG. 5. The EFI boot services 82 typically include an EFI core engine and EFI drivers and plug-ins. The EFI drivers perform advanced platform initialization such as hard disk, keyboard, monitor, and operating system boot loading as examples. The EFI boot services 82 may define extrinsic services which are used by an EFI device driver or other plug-ins. The EFI boot manager bootstraps the boot process by loading the operating system from local storage or, through access to a network, by implementing a Pre-boot Execution Environment (PXE) protocol. Pre-boot Execution Environment (PXE) Specification, Ver. 2.1, Sep. 20, 1999 by Intel Corporation, Santa Clara, Calif. (available at www.intel.com). Thus the EFI supports the PXE protocol to transport images across a network.

The present invention is not limited to the use of the EFI, IAC SFL or PXE protocols. These protocols are simply one convenient way to implement an embodiment of the present invention.

The EFI provides an interface between the operating system 74 and the platform firmware 86. The interface may be in the form of data tables that contain platform related information and boot services 82 and run time services 84 calls that are available to the operating system and its loader 76. Together, these provide a standard environment for booting an operating system. A legacy operating system loader 78 may also be provided.

Once started, the OS loader 76 continues to boot the operating system 74. To do so, it may use the EFI boot services 82. An interface is defined by the EFI specification to initialize the various platform components and the operating system software that manages these components. EFI run time services 84 are also available to the operating system loader 76 during the boot phase.

The primary purpose of the EFI run time services 84 is to abstract the parts of the firmware and implementation of the platform from the operating system. The EFI run time service functions are available during the boot process and also at run time provided the operating system switches into a flat physical addressing mode to make the run time call.

The first piece of operating system code loaded by the firmware to initiate the operating system boot process is the EFI operating system loader 76. This code is loadable at a fixed address and then executed. The operating system takes control of the system prior to completing the operating system boot process by calling the EFI interface that terminates all boot services. The platform hardware may include a partition 94 of the operating system and a partition 90 for the EFI system that includes the EFI operating system loader 76.

PXE specifies a set of uniform and consistent pre-boot protocol services to enable network based booting. Remote boot images such as network bootstrap programs (NBPs) may be downloaded by a client by way of a trivial file transfer protocol (TFTP). TFTP is an industry standard Internet Protocol to enable the transmission of files across the Internet. (See RFC 1350, available at www.ietf.com). Other file transfer protocols may be utilized as well. The operation of a system which uses TFTPs and NBPs is described in the PXE protocol.

PXE allows for remote system startup. PXE provides the uniform protocol for the client to request the allocation of a network address and subsequently handles the downloading of an NBP from a network boot server. It also provides a set of application program interfaces (APIs) available on the client's pre-boot firmware environment that constitute a set of services that can be employed by the NBP or by BIOS. Finally, PXE provides a standard method of initiating the pre-boot firmware to execute the PXE protocol on the client.

A newly installed network client may enter a heterogeneous network, acquire a network address from a DHCP server and then download an NBP to set itself up. Thus, with PXE, a client such as the system 10 may be connected to a network 12 in an automatic fashion during the boot sequence.

Figure 2:
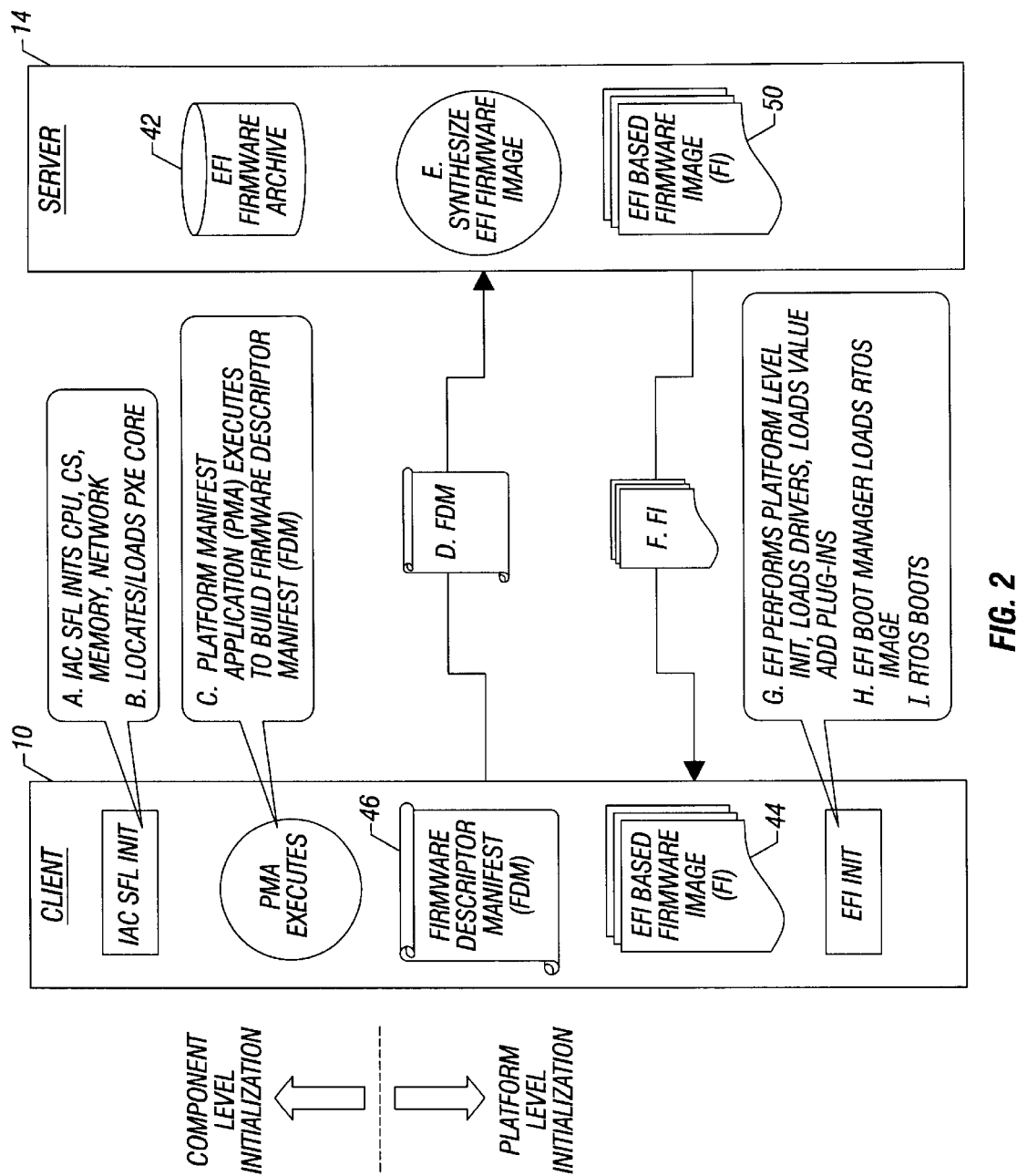
FIG. 2 is a schematic flow diagram for implementing one embodiment of the present invention.

Referring to FIG. 2, the client 10 may work with a server 14 during the initialization sequence. Initially, the IAC SFL performs component level initialization as indicated at A. The IAC SFL may initialize the processor, a chipset, a memory, and a network card, as examples. During component level initialization those components needed to make a network connection are initialized. The IAC SFL may then locate and load a PXE core, for example from the NIC 30 as indicated at B. This enables PXE interface which includes TFTP.

The platform manifest application (PMA) builds the platform's firmware descriptor manifest (FDM) 46, as indicated at C. This manifest 46 is delivered to the firmware server 14 through PXE, as indicated at D.

Next, the firmware server 14 generates an EFI core with relevant device drivers using the manifest, as indicated at E. The EFI based platform firmware image 50 is delivered to the requesting client 10 as indicated at F. The EFI firmware image 44, on the client, is used for platform level initialization as indicated at G. For example, the EFI may implement PCI enumeration, keyboard and monitor initialization, loading drivers, and loading plug-ins. An example of such a plug-in is a Simple Network Management Protocol (SNMP) (RFC 1157). The EFI core provides an EFI interface.

An EFI boot manager application may load the operating system image over the network 12, for example, using the EFI interface and the PXE protocol as indicated at H. The operating system, which may be a real time operating system, then boots as indicated at I.

Figure 3:
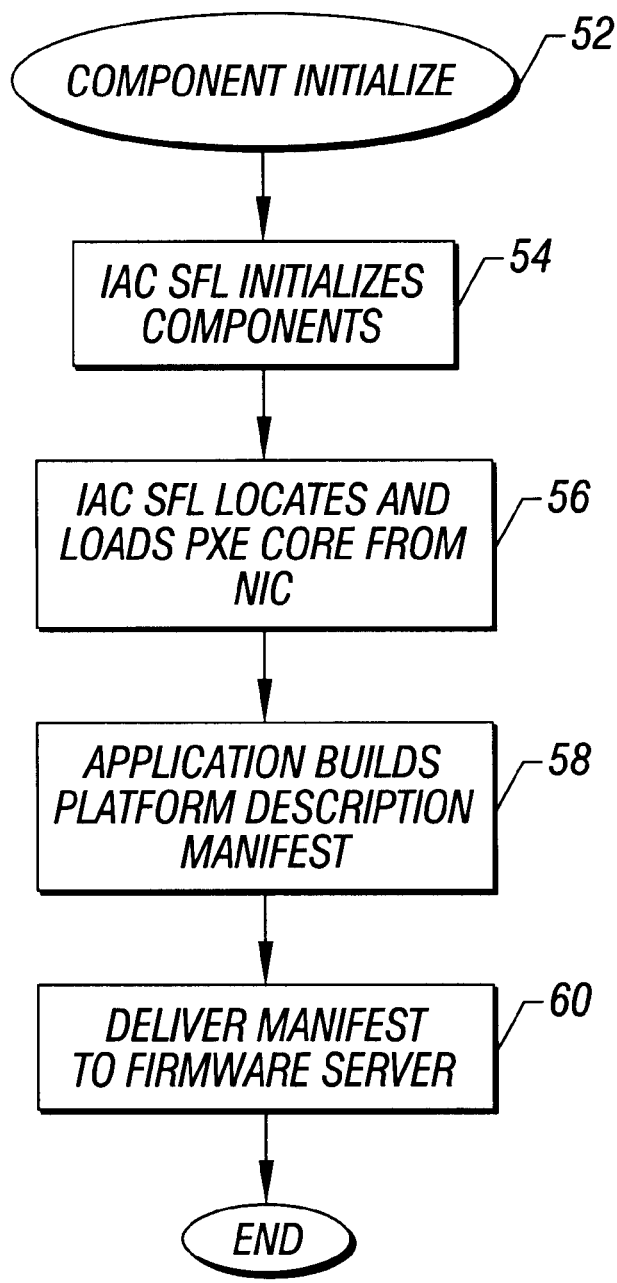
FIG. 3 is a flowchart for software for initializing components in accordance with one embodiment of the present invention.

Referring to FIG. 3, the software 52 flow for the component level initialization, in one embodiment of the invention, begins by allowing the IAC SFL to initialize the components as indicated in block 54. The IAC SFL then locates and loads the PXE core from a NIC 30 as indicated in block 56. Next, the platform manifest application builds the platform's firmware description manifest as indicated in block 58. The manifest is thereafter delivered to the firmware server 14 as indicated in block 60. At this stage, the component level initialization is complete. The component level initialization may be accomplished using the information stored on the ROM 28 to provide the needed applications.

Figure 4:
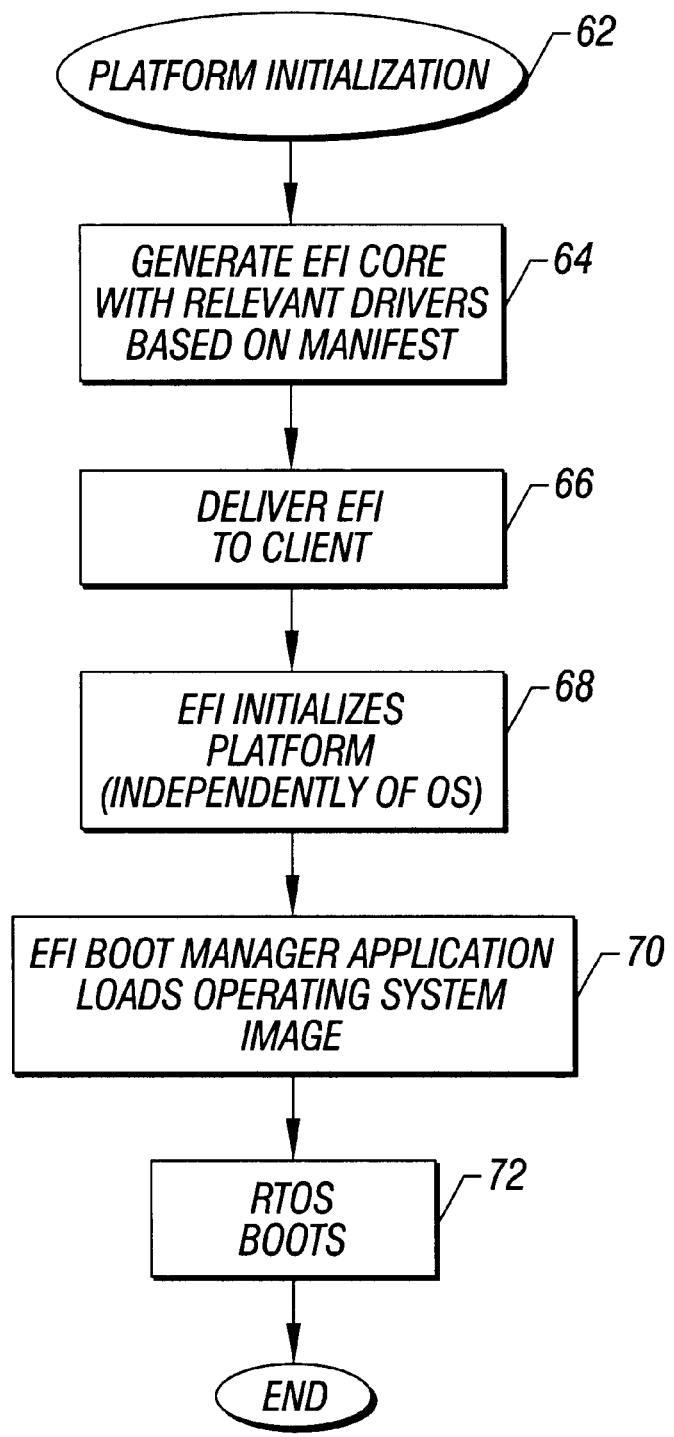
FIG. 4 is a flowchart for software for platform initialization in accordance with one embodiment of the present invention.

Referring next to FIG. 4, the platform level initialization software 62 generates the EFI core using relevant drivers as defined by the manifest (block 64) in accordance with one embodiment of the invention. The firmware descriptor manifest 46 and the EFI based firmware image 44 may be loaded into system memory 20.

The EFI core is then delivered to the client 10 as indicated in block 66. The EFI core initializes the processor-based system 10 as shown in block 68. This initialization may be independent of the type of operating system and may be accomplished before initializing the operating system.

An EFI boot manager application loads an operating system image as shown in block 70. The operating system, which may be a real-time operating system, then boots as suggested in block 72.

The flexibility of a firmware server that may dynamically generate a firmware image based on the platform descriptor, may enhance the manageability of network attached processor-based systems. For example, the initialization software developed by the firmware server may dynamically adjust for improvements, modifications, fixes, and special advanced features, including those developed after the release of the system 10.

The manifest may be modified at run time to configure the platform in a safe mode. The firmware server may then build a platform kernel with safe mode platform drivers, which enhance debugging capabilities for network attached processor-based systems. The safe mode drivers ensure that the platform boots with the featured device driver support.

Thus, the local storage used for initialization routines may be reduced, in some embodiments of the present invention, by relocating platform firmware components to a network firmware server. The server may then be accessed through standard network protocols in one embodiment to the present invention.

Thus, firmware updates may be implemented by relocating platform firmware modules to a network firmware server, in one embodiment to the present invention. If the firmware server is updated with the latest firmware modules, all devices on the network may have access to the updated modules the very next time they boot.

The use of the two stage boot process is advantageous. In a first stage, involving component level initialization, everything that is needed to establish a network connection is initialized. Thereafter, platform level initialization may be accomplished in an operating system independent fashion.

In this way, two different portions of a memory, such as a flash memory as one example, may be dedicated to the different stages of the boot process. For example, one portion of the flash memory may be utilized during platform initialization and another portion may be utilized during component level initialization. If desired, only the platform level initialization may be upgraded. This avoids the risk of corrupting the ability of the system to perform the basic, component level initialization which reduces the risk of not being able to connect to a network. Once the system has accomplished component level initialization, any other problems can be normally overcome through downloading of fixes through the network connection. By providing separate memory sections for component level initialization and platform level initialization and limiting upgrades to platform level initialization, the stability of the system may be improved in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   building a description of a processor-based system automatically;
   transmitting the description to a remote server automatically;
   using said description by the remote server to build a platform image; and
   performing platform-level initialization using said image received from the remote server.

2. The method of claim 1 wherein said remote server is a firmware server, and receiving from said firmware server, an initialization routine.

3. The method of claim 2 further including initiating a network connection during the initialization of said processor-based system.

4. The method of claim 1 wherein building a description includes specifying peripherals which may be incorporated into said processor-based system.

5. The method of claim 1 wherein performing platform-level initialization includes loading a driver.

6. The method of claim 1 further including booting a real time operating system.

7. An article comprising a medium for storing instructions that cause a processor-based system to:
   build a description of a processor-based system automatically;
   transmit the description to a remote server automatically;
   use said description by the remote server to build a platform image; and
   perform platform-level initialization using said image received from the remote server.

8. The article of claim 7 wherein said remote server is a firmware server and to receive from said firmware server an initialization routine.

9. The article of claim 8 further storing instructions that cause a processor-based system to initiate a network connection during the platform level initialization.

10. The article of claim 7 storing instructions that cause a processor-based system to specify peripherals which may be incorporated into said processor-based system.

11. The article of claim 7 storing instructions that cause a processor-based system to load a driver.

12. The article of claim 7 further storing instructions that cause a processor-based system to boot a real time operating system.

13. A processor-based system comprising:
   a processor;
   a medium to store instructions that cause a processor-based system to build a description of said processor-based system automatically, to use said description to build a platform image, and to perform platform-level initialization using said image; and
   an interface to communicate said description automatically to a remote server and to receive initialization software from said remote server.

14. The system of claim 13 wherein said medium includes pre-boot execution environment software that enables a remote server to be accessed during the boot sequence.

15. The system of claim 13 including an extensible firmware interface core.

16. The system of claim 13 including a real time operating system.

17. The system of claim 13 including software to implement a component level through initialization sequence.

18. The system of claim 17 wherein said description is used for system level initialization.

19. The system of claim 13 including a server coupled to said processor through said interface.

20. The system of claim 19 wherein said server stores software to develop initialization software for said processor using said description.

* * * * *